United States Patent
Amata et al.

(10) Patent No.: US 9,604,315 B2
(45) Date of Patent: *Mar. 28, 2017

(54) ALUMINUM DEOXIDIZING WELDING WIRE

(71) Applicant: ILLINOIS TOOL WORKS INC., Glenview, IL (US)

(72) Inventors: Mario Anthony Amata, Dublin, OH (US); Joseph C. Bundy, Piqua, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,724

(22) Filed: Oct. 19, 2015

(65) Prior Publication Data

US 2016/0039051 A1 Feb. 11, 2016

Related U.S. Application Data

(60) Division of application No. 14/463,266, filed on Aug. 19, 2014, now Pat. No. 9,162,323, which is a (Continued)

(51) Int. Cl.
*B23K 35/34* (2006.01)
*B23K 35/02* (2006.01)
(Continued)

(52) U.S. Cl.
CPC ............ *B23K 35/0266* (2013.01); *B23K 9/16* (2013.01); *B23K 35/0261* (2013.01);
(Continued)

(58) Field of Classification Search
CPC ............ B23K 35/0266; B23K 35/0261; B23K 35/286; B23K 35/3053; B23K 35/3093;
(Continued)

(56) References Cited

U.S. PATENT DOCUMENTS 2,988,627 A 6/1961 Koopman
3,558,851 A 1/1971 Cku
(Continued)

FOREIGN PATENT DOCUMENTS

CN 1209376 3/1999
CN 1260261 7/2000
(Continued)

OTHER PUBLICATIONS

"Specification for Carbon Steel Electrodes for Flux Cored Arc Welding", ANSI, AWS A5.20/A5.20M:2005 an American national Standard.
(Continued)

*Primary Examiner* — Brian Jennison
(74) *Attorney, Agent, or Firm* — Fletcher Yoder P.C.

(57) ABSTRACT

Provided is a welding method and electrodes (wires) with aluminum as a primary deoxidizer and a basic flux system for joining a workpieces with weld metal of comparable strengths and enhanced toughness. For instance, provided is a welding wire, comprising an aluminum content configured to act as a primary deoxidizer, and an overall composition configured to produce a weld deposit comprising a basic slag over a weld bead, wherein the aluminum content is configured to kill the oxygen in the weld pool, and wherein the oxygen comprises oxygen provided by a shielding gas or produced by heating of welding filler materials. Further provided is a welding method comprising arc welding a workpiece using an electrode having aluminum as a primary deoxidizer under a gas shield to produce a bead of weld deposit and a basic slag over the weld bead.

19 Claims, 2 Drawing Sheets

Figure 1:
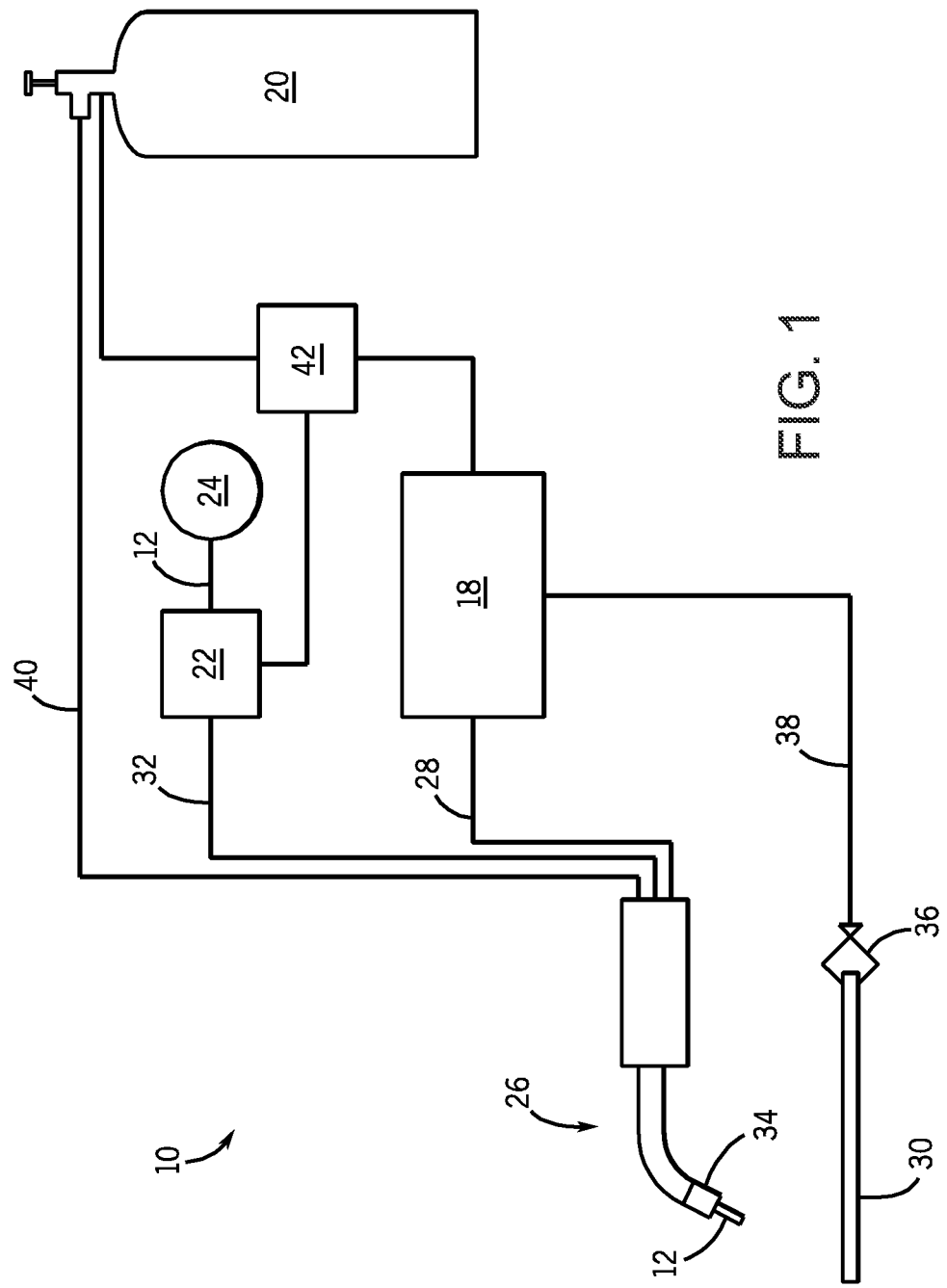

Related U.S. Application Data continuation of application No. 11/799,893, filed on May 3, 2007, now Pat. No. 8,907,248.

(51) Int. Cl.
  *B23K 35/28* (2006.01)
  *B23K 35/30* (2006.01)
  *B23K 35/368* (2006.01)
  *B23K 35/38* (2006.01)
  *B23K 9/16* (2006.01)
  *B23K 35/36* (2006.01)

(52) U.S. Cl.
  CPC ........ *B23K 35/286* (2013.01); *B23K 35/3053* (2013.01); *B23K 35/3093* (2013.01); *B23K 35/36* (2013.01); *B23K 35/368* (2013.01); *B23K 35/38* (2013.01); *B23K 35/383* (2013.01)

(58) Field of Classification Search
  CPC ...... B23K 35/36; B23K 35/368; B23K 35/38; B23K 35/383; B23K 9/16
  See application file for complete search history.

(56) References Cited

U.S. PATENT DOCUMENTS

| | | | |
|---|---|---|---|
| 3,627,574 A | 12/1971 | Delong | |
| 3,787,658 A | 1/1974 | Kammer | |
| 4,003,766 A * | 1/1977 | Ito | B23K 35/3601 148/24 |
| 4,186,293 A * | 1/1980 | Gonzalez | B23K 35/368 219/146.24 |
| 4,510,374 A | 4/1985 | Kobayashi | |
| 4,551,610 A | 11/1985 | Amata | |
| 5,233,160 A | 8/1993 | Gordish | |
| 5,365,036 A | 11/1994 | Crockett | |
| 5,857,141 A | 1/1999 | Keegan | |
| 6,713,723 B2 | 3/2004 | Lee | |
| 6,835,913 B2 | 12/2004 | Duncan | |
| 7,732,733 B2 | 6/2010 | Kobayashi | |
| 2003/0116550 A1 | 6/2003 | Lee | |
| 2005/0205525 A1 | 9/2005 | Barhorst | |
| 2006/0096966 A1 * | 5/2006 | Munz | B23K 35/0266 219/145.22 |
| 2006/0165552 A1 | 7/2006 | Kapoor | |
| 2007/0051703 A1 | 3/2007 | Neff | |
| 2008/0078809 A1 | 4/2008 | Kapoor | |

FOREIGN PATENT DOCUMENTS

| | | |
|---|---|---|
| CN | 1814396 | 8/2006 |
| GB | 1183463 | 3/1970 |
| JP | 48059041 | 8/1973 |
| JP | 52065736 | 5/1977 |
| JP | 57072795 | 7/1982 |
| JP | 59007495 | 1/1984 |
| JP | 61232097 | 10/1986 |
| JP | 62166098 | 7/1987 |
| JP | 2004058086 | 2/2004 |

OTHER PUBLICATIONS

"Specification for Low-Alloy Steel Electrodes for Flux Cored Arc Welding", ANSI, AWS A5.29/A5.29M:2005 An American National Standard.
"The Metallurgy of Innershield", The Lincoln Electric Company, Cleveland, OH.
Dongwon, Kim, "Workshop Practice", Cheong Moon Gak Publishing, Jan. 10, 1993, pp. 148-149.
Office action for Korean Patent Application No. 10-2009-7022982, dated Jun. 5, 2014, 18 pages.
Submerged Arc Welding Flux.

* cited by examiner

| | | Electrode 1 | Electrode 2 | Electrode 3 | Electrode 4 | Electrode 5 | Electrode 6 |
|---|---|---|---|---|---|---|---|
| Electrode Flux Composition | Fe | 35.1 | 49.7 | 23.53 | 11.83 | 7.46 | 12.47 |
| | Mn | 0 | 0 | 2.7 | 7.12 | 7.22 | 5.5 |
| | C & Graphite | 0.4 | 0.5 | 0 | 0.19 | 0.16 | 0 |
| | Mo | 0 | 0 | 2.27 | 0.56 | 0.56 | 0.74 |
| | Cr | 0 | 0 | 10.1 | 1 | 1 | 0.19 |
| | Ni | 0 | 0 | 0 | 15 | 15 | 14.5 |
| | Si | 0 | 0 | 0 | 0 | 0 | 0 |
| | Cu | 0 | 0 | 0 | 0 | 0 | 0 |
| | Mg | 5.6 | 6 | 5.35 | 5.5 | 5.5 | 5.5 |
| | Ca | 0 | 0 | 0 | 0 | 0 | 0 |
| | Al | 4.9 | 6 | 3.85 | 4.8 | 7.1 | 5.1 |
| | Zr | 0.46 | 0.46 | 0.55 | 0.46 | 0.46 | 0.46 |
| | | | | | | | |
| | Basicity Index | 99.00 | infinite | infinite | 98.80 | 51 | 51 |
| Percent of Electrode | | 21.2 | 18 | 21.4 | 21.2 | 21.6 | 21.2 |
| Deposit Chemistry | C | 0.131 | 0.16 | 0.102 | 0.089 | 0.095 | 0.06 |
| | P | 0.009 | 0.007 | 0.013 | 0.016 | 0.011 | 0.005 |
| | S | 0.001 | 0.004 | 0.005 | 0.012 | 0.009 | 0.004 |
| | Mn | 0.36 | 0.33 | 0.99 | 1.71 | 1.85 | 1.72 |
| | Ni | 0.01 | 0.02 | 0.03 | 3.87 | 3.35 | 4.05 |
| | Si | 0.08 | 0.07 | 0.09 | 0.1 | 0.19 | 0.18 |
| | Al | 0.35 | 0.56 | 0.524 | 0.46 | 0.99 | 0.72 |
| | Zr | 0.03 | 0.03 | 0.07 | 0.03 | 0.06 | 0.05 |
| | Cr | 0.04 | 0.05 | 2.84 | 0.31 | 0.34 | 0.28 |
| | Mo | 0.02 | 0.01 | 0.991 | 0.24 | 0.27 | 0.34 |
| | Cu | 0.06 | 0.07 | 0.041 | 0.017 | 0.26 | 0.04 |
| | O | 0.0125 | 0.012 | 0.0113 | 0.005 | 0.0088 | 0.0129 |
| | N | 0.0028 | 0.0056 | 0.0046 | 0.0036 | 0.0039 | 0.0049 |
| Mechanical Properties | Yield Strength (Ksi) | 60 | 52.3 | 79 | 115.6 | 120.9 | 114.9 |
| | Tensile Strength (Ksi) | 72.1 | 72 | 97.1 | 132 | 130.6 | 122.4 |
| | % Elongation | 28.1 | 23.2 | 23.1 | 18.7 | 20.5 | 18.8 |
| | CVN (Ft-lbs) @-20F | | | 157.4 | | | |
| | CVN (Ft-lbs) @-40F | 189 | 132 | | 60 | 49 | |
| | CVN (Ft-lbs) @-60F | | | | | | 67 |
| | CVN (Ft-lbs) @-76F | | | | 57 | 35 | |

FIG. 2

ALUMINUM DEOXIDIZING WELDING WIRE

CROSS REFERENCE TO RELATED APPLICATIONS

This is a Divisional Patent Application of U.S. Non-Provisional patent application Ser. No. 14/463,266, entitled "ALUMINUM DEOXIDIZING WELDING WIRE", filed Aug. 19, 2014, which is a Continuation patent application of U.S. Non-Provisional patent application Ser. No. 11/799,893, entitled "ALUMINUM DEOXIDIZING WELDING WIRE", filed May 3, 2007, which is herein incorporated by reference in its entirety for all purposes.

BACKGROUND

The invention relates generally to the field of welding systems, and more particularly to welding wires that improve characteristics of a weld.

Welding systems generally make use of electrodes configured to pass an arc between a torch and a workpiece, thereby heating the workpiece to create a weld. A number of forms of welding are known and are generally used in the art. In many systems, such as metal inert gas (MIG) systems, the wire electrode is advanced through a welding torch and is generally consumed by the heat of the arc. In such operations, the wire electrode may also be referred to as a "filler material" that becomes part of the weld. Although gas is used to shield the weld in many applications, certain types of welding wire do not require shielding gas, and with such wires it would be unusual or even not recommended to use a gas. These may be referred to as self-shielded welding wires.

The selection of the type of wire electrode used for a particular welding application may be based on several factors, including, the composition of the metals being welded, the joint design and the material surface conditions. In general, it is desirable that the wire electrode has mechanical properties similar to those of the base material and produces no discontinuities, such as porosity. Mechanical properties of the weld may be characterized, for example, by the yield strength and impact strength (i.e., toughness) of the weld joint. Generally it is desirable that the weld exhibit a yield strength greater than the yield strength of the workpiece. The impact toughness may also be considered as an index of the likelihood of failure of the resulting structure. Therefore, it is desired that the wire electrode include properties to provide a weld with the desired yield strength and toughness.

In addition, wire electrodes may be used in various welding processes. For example, certain applications may require welding on a flat surface while other applications may require welding vertically. The metallurgy of the wire electrode, along with other factors, such as the orientation of the metal parts being joined, may dictate the available and optimal welding positions. Wire electrodes that enable welding in multiple positions are often considered to provide an increased level of flexibility because they are suitable for use in a number of welding situations and environments. For example, a wire electrode that can be used vertically and overhead may enable the joining of pipes and construction members in structural construction.

Accordingly, there is a need for a welding wire that provides a weld including the desired strength and toughness, and that permits welding in various weld positions.

BRIEF DESCRIPTION

The invention provides a welding wire electrode and a welding technique designed to respond to such needs. In accordance with one aspect of the present invention a welding method comprising arc welding a workpiece using an electrode having aluminum as a primary deoxidizer under a gas shield to produce a bead of weld deposit and a basic slag over the weld bead.

In accordance with another aspect of the present invention a welding method is provided including arc welding a workpiece using an electrode under a gas shield to produce a bead of weld deposit and a basic slag over the weld bead, wherein the weld deposit has an aluminum content within a range of about 0.15 to 1.1% by weight.

A welding wire is also provided that has an aluminum content configured to act as a primary deoxidizer. The welding wire also has an overall composition configured to produce a weld deposit comprising a basic slag over a weld bead, wherein the aluminum content is configured to kill the oxygen in the weld pool, and wherein the oxygen comprises oxygen provided by a shielding gas or produced by heating of welding filler materials.

DRAWINGS

These and other features, aspects, and advantages of the present invention will become better understood when the following detailed description is read with reference to the accompanying drawings in which like characters represent like parts throughout the drawings, wherein:

FIG. 1 illustrates an exemplary welding system in which the wire electrode of the present invention may be employed; and FIG. 2 is a table illustrating the composition and mechanical properties of exemplary wire electrodes and their weld deposits in accordance with aspects of the present technique.

DETAILED DESCRIPTION

As discussed in greater detail below, a welding wire includes various characteristics to provide desired performance and weldability. For example, with some embodiments of the welding wire the resulting weld includes an increased level of impact toughness. Further, embodiments of the welding wire also include a composition that lends itself to welding in a variety of positions and situations. For example, some embodiments of the welding wire discussed below are considered to include an "all-position" capability and substantially lower spatter than self-shielded electrodes. Accordingly, the welding wire may be used in applications that require welding in "all-positions," such as joining pipe and structural steel construction. These characteristics are believed to be the result of the welding wire composition and the methods used to weld with embodiments of the welding wire. For instance, embodiments of the welding wire include increased concentrations of aluminum and an overall composition configured to produce a basic slag system. Embodiments also include welding with the described welding wire under a shielding gas. As discussed below, it is has been shown that the combination of aluminum as a deoxidizer, the basic slag system and the use of a shielding gas may provide a resulting weld that includes high strength, toughness and increased weldability.

Referring now to FIG. 1, welding system 10 is illustrated that employs a welding wire (i.e., an electrode) 12 in accordance with one embodiment of the present technique.

As depicted, the MIG welding system 10 includes a power source 18, a shielding gas source 20, a wire feeder 22, an electrode source 24 and a welding gun 26. In the illustrated embodiment, the power source 18 supplies power to the electrode 12 via a power conduit 28 and the welding gun 26. In the welding system 10, an operator may control the location and operation of the electrode 12 by positioning the electrode 12 and triggering the starting and stopping of current flow. In gas metal arc welding, the power source 18 typically will supply a constant voltage to aide in maintaining a stable arc length as the distance from the electrode 12 to a work piece 30 is changed.

During a welding operation, the welding wire feeder 22 advances electrode 12 from the welding wire source 24. As depicted, the welding wire source 24 may include a spool that unwinds as the wire feeder 22 draws and feeds the electrode 12 through a conduit 32 and a contact tip 34 of the welding gun 26. A liner may be included in the path to the contact tip 34 to prevent bucking of the electrode 12 and to maintain an uninterrupted feed to the welding gun 26. The electrode 12 may be advanced through the welding gun 26 when operator pulls a trigger on the welding gun 26 or provides another signal to advance the electrode 12.

The welding arc is created as current flows from the tip of the electrode 12 to the work piece 30 and returns to the power source 18. Therefore, the workpiece 30 is generally grounded to the power source 18 to provide an electrical path for the current. For example, as depicted, a work clamp 36 and cable 38 complete the electrical path between the work piece 30 and the power source 18.

Some forms of arc welding may include a shielding gas 20 to protect the weld area from atmospheric gases such as nitrogen and oxygen. If the weld is left unprotected, the atmospheric gases can cause fusion defects, porosity and weld metal embrittlement. As depicted in FIG. 1, the shielding gas 20 may be provided to the welding gun 26 from a shielding gas source via a gas supply conduit 40. Typically, the shielding gas 20 is expelled near the tip of the welding gun 26 and encapsulates the welding location, including the weld pool, as the electrode 12 and the metal of the workpiece 30 are heated to a molten state and cooled. In some applications, the shielding gas 20 is automatically supplied during the welding operation and is automatically shut-off when (or just after) the operation is interrupted.

The system 10 also includes a control circuit 42 that coordinates functions of the system 10. For example, the control circuit 42 may be in communication with the power source 18, the wire feeder 22 and/or the source of the shielding gas 20 and configured to coordinate the operation of the system 10. Thus, the current, wire speed and shielding gas 20 may all stop and start in cooperation.

As mentioned previously, the electrode 12 may be continuously fed to the weld location and consumed by the heat of the welding arc created between the electrode 12 and the workpiece 30. Thus, the material of the electrode 12 is melted into the weld pool and the electrode composition may strongly influence the mechanical properties of the weld. Accordingly, it is generally desired that the composition of the electrode 12 be compatible with the composition of the work piece 30. For instance, it is desirable that a weld include mechanical properties (such as yield strength and impact strength) that are compatible with the workpiece 30 and surrounding metals. To prevent failure of the weld, it may be desired that the mechanical properties of the weld, including yield strength and impact toughness exceed the similar properties of surrounding workpiece 30.

Further, the composition of the electrode 12 may also affect the ease of welding. For example, some electrodes 12 may reduce spatter during welding, enable easier slag removal, enable welding flat surfaces, enable welding with direct current of different polarities (such as direct current electrode negative (DCEN) or direct current electrode positive (DCEP)) or enable welding in a variety of positions, including vertical and overhead positions. As mentioned above, an increased number of welding positions increases the flexibility of the electrode 12 and may extend use of the electrode 12 to other fields, such as joining pipe, structural steel construction and the like. An electrode 12 that enables welding in all of these positions may be referred to as an electrode 12 configured for use in "all-position" welding.

The electrode 12 may include any number of characteristics to increase performance and weldability. As discussed further below, embodiments include varying the compositions of the electrode 12, and/or the methods used to weld with the electrode 12, to produce the desired mechanical properties and weldability. Variations may include the addition of aluminum as a primary deoxidizer, an overall composition of the fluxing materials configured to produce a basic slag, the use of gas shielding, and DCEN polarity.

FIG. 2 illustrates the composition and characteristics of six embodiments of electrodes 12. The table includes compositions of each of the electrodes, as well as the compositions of the resulting weld deposits. The metallic components of the flux mix contained in the core of the electrode 12 are indicated as a weight percent of the electrode flux composition. The percent of the electrode 12 that comprises the flux mix is also provided. As depicted, the flux mix is generally about 22% by weight of the total composition of the electrode 12 (see FIG. 2 "percent of electrode"). The electrode composition is described with regard to alloying elements as well as the basicity index. The basicity index may be arrived at via equation (1), discussed in greater detail below. Further, FIG. 2 indicates various resulting mechanical properties derived from testing of the weld generated by each test electrode 12. For example, the mechanical properties include the yield strength, tensile strength, and impact toughness of the resulting weld. The relationship between each of the features of the electrodes 12 is discussed in greater detail below.

In welding of ferrous materials, the electrode 12 generally includes an iron core composition alloyed with other elements to provide various weld characteristics. A function of these alloying elements generally includes controlling deoxidation of the weld pool to influence the mechanical properties of the resulting weld. Deoxidation generally includes the combination of an element with oxygen to form stable oxides and, thus, reduce the amount of dissolved oxygen in the weld. Often, the phrase deoxidation may include the "denitridation" which similarly describes the combination of an element with nitrogen to form stable nitrides to reduce the amount of dissolved nitrogen in the weld. If the molten metal of the weld pool is not deoxidized, the effervescence produced by the oxygen and nitrogen in the weld pool may lead to increased porosity and, also reduce impact properties of the weld. In other words, the oxygen and nitrogen trapped in the weld may create a brittle weld. The concern generally exists due to oxygen and nitrogen that is present in atmospheric air surrounding the molten weld pool or gases that are given off by the melting electrode 12. Such nitrogen and oxygen may be trapped in the weld pool as it cools. Deoxidizing elements may include silicon, magnesium, titanium, zirconium, manganese, aluminum, and the like. Deoxidizing may be provided for by alloying small amounts of silicon (about 0.40%-1.00% by weight), manganese (about 1.00%-2.00% by weight) and/or aluminum, titanium and zirconium into the electrode composition. In accordance with the present invention, aluminum is the primary deoxidizing agent. Embodiments of the flux mix of the welding wire may include a welding wire composition of about 2% to about 11% by weight aluminum. The flux mix generally comprises about 22% of the electrode 12. Accordingly, the overall composition of the electrode 12 is about 0.4% to about 2.5% by weight aluminum. As shown in FIG. 2, the compositions of the flux mix of the six test electrodes 12 include about 3.85% to about 7.1% by weight aluminum. Similarly, the composition of the weld deposit may include about 0.15% to about 1.1% by weight aluminum. As shown in FIG. 2, the weld deposit composition of the six test electrodes 12 includes about 0.35% to about 0.99% by weight aluminum in the all-weld-metal deposit.

The addition of aluminum as a deoxidizer in self-shielded electrodes 12 generally acts to fix most of the nitrogen acquired by the weld metal by the formation of very fine aluminum nitride particles, thereby reducing the free nitrogen that is highly detrimental to impact properties. In embodiments that include welding with the addition of a shielding gas (as discussed in detail below), the shielding gas 20 may prevent the majority of oxygen and nitrogen present in atmospheric air from reaching the weld pool. Accordingly, the aluminum may primarily combine with gases that are produced by the heating and melting of the electrode 12. Further, the addition of a shielding gas 20 that prevents atmospheric air from reaching the weld pool may reduce the need for other elements in the composition of the electrode 12. For instance, the amount of lithium may be reduced or eliminated from the composition because lithium is generally used to reduce the amount of nitrogen that enters the weld pool. The addition of the shielding gas 20 may prevent nitrogen from entering the weld pool and, thus, reduce or eliminate the need for lithium.

It is noted that the use of aluminum in steel may be generally considered to reduce the physical properties of the steel. Further, the use of aluminum with an acidic slag system is restricted because it may reduce toughness. However, embodiments of the electrode 12 summarized in the table indicate that when properly balanced with austenite stabilizers, the use of aluminum and a flux mix composition that produces a basic slag system can result in clean weld metal with an increase in toughness. Austenite stabilizers may include manganese, carbon, copper and nickel, to name a few. Accordingly, embodiments of the electrode 12 may include concentration of manganese, carbon, copper and nickel, as shown in FIG. 2.

Due to the use of aluminum as a primary deoxidizer, the need for other deoxidizing elements may be reduced. For instance, as mentioned above, silicon and manganese are generally added to electrodes 12 to act as a deoxidizer. However, with the addition of aluminum as a primary deoxidizer, silicon and manganese may be removed from the overall composition, except as required for purposes other than deoxidation. For example, as shown in FIG. 2, the composition of silicon in the electrode 12 may be substantially nil, with an amount in the weld deposit of about 0.09% to about 0.14% by weight. Similarly, as shown in FIG. 2, the composition of manganese in the flux mix may be about 0.0% to about 7.22% by weight. As mentioned above, the flux mix generally comprises about 22% of the electrode 12. Accordingly, the electrode 12 is about 0% to about 1.58% by weight manganese. The desired all-weld-metal deposits may include about 0.33% to about 2.5% by weight manganese.

The electrode 12 may also include an overall composition configured to produce a basic slag, as mentioned previously. Generally, the welding slag includes a portion of wire that enters the weld pool and then rises to the surface and cools above the primary weld. Welding slag may include oxides, silicates and other impurities that are separated from the molten metal forming the primary weld. Typically, the slag may be chipped away and removed, leaving only the primary weld in place. Accordingly, the flux mix that forms a substantial part of the slag system and its composition may be instrumental in removing impurities from the weld.

The flux ingredients as a whole may be classified by a basicity index (B) that describes the flux as acidic, neutral, basic or highly basic. The basicity index (B) can be calculated with the following formula:

$$B = \frac{CaO + MgO + Li_2O + Na_2O + K_2O + CaF_2 + \frac{1}{2}(MnO_x + Fe_xO_y) + BaCO_3 + CaCO_3 + K_2SiF_6 + BaO + BaF_2 + SrF_2 + Ce_2O_3 + LiF_2}{SiO_2 + \frac{1}{2}(Al_2O_3 + TiO_2 + ZrO_2)} \quad (1)$$

where $Fe_xO_y$ may include $FeO$, $Fe_2O_3$, $Fe_3O_4$, and the like, and where $MnO_x$ may include $MnO$, $MnO_2$, $Mn_2O_3$, and $Mn_3O_4$, and the amphoteric compounds described below. The different slag types are then defined according to their basicity, as follows: acidic for B<0.9; neutral for B=0.9-1.2; basic for B=1.2-2.0; and highly basic for B>2.0. Generally, more acidic slag system designs may offer better operability and weld appearance. A more basic slag system tends to produce a weld that is cleaner and, thus, a weld that includes (higher) more impact toughness when compared to the more acidic slag. This may be due to basic components not contributing oxygen to the weld pool and the acidic components contributing oxygen to the weld pool. Amphoteric components may not be a concern in this calculation because they exchange oxygen back and forth between the weld deposit and the slag, and, thus, may not tend to affect the weld metal oxygen level.

Embodiments of the electrode 12 may include basicity indices indicative of a generally basic composition (i.e., basic or highly basic). For instance, in one embodiment, the slag may system may include a basicity index greater than 1. In other embodiments, the basicity index of the slag system may include a range of approximately 85 to an infinite value, as shown by the compositions illustrated in FIG. 2. The high basicity index may be achieved by the addition of basic components or by reducing the acidic components to a relatively low level.

As noted in equation 1, the slag system may include various basic components, including calcium fluoride ($CaF_2$). In an embodiment of the electrode 12, barium fluoride ($BaF_2$) may be substituted for the calcium fluoride. In certain electrode compositions, the concentration of calcium fluoride is reduced to zero, or near zero, while the concentration of barium fluoride may be increased. Other embodiments of the basic slag system may include various compounds based on the needs of a specific application and desired properties. For instance, similar results may be obtained with formulations that substitute $SrF_2$, $BaF_2$ and $CaF_2$.

Although it has been noted that the electrode 12 may comprise about 22% by weight flux mix, other embodiments may include a flux mix that is a higher or lower percentage of the electrode composition. For example, the total percent of the electrode 12 that is flux mix may range from about 10% to about 40% by weight.

As mentioned above in relation to the addition of aluminum as a primary deoxidizer, a shielding gas 20 may be used to reduce the exposure of the weld to oxygen and nitrogen present in the atmospheric air. That is, encapsulating the weld and the weld pool in the shielding gas 20 may prevent the atmospheric air from combining with the weld. In certain embodiments the shielding gas 20 may include known "off-the-shelf" shielding gases. For instance, the shielding gas may include 75% argon and 25% carbon dioxide. Other embodiments may include combinations of the three primary shielding gases: argon, helium, and carbon dioxide. The inert nature of the shielding gas prevents the shielding gas itself from introducing oxygen and nitrogen into the weld pool and increasing the potential for oxidation. Similar inert shielding gas mixtures may be used to shield the weld from contamination by undesired elements, such as oxygen and nitrogen.

The use of the shielding gas 20 may also contribute to improved weldability of the electrode 12 within the system 10. The addition of the shielding gas 20 may aid in a predominately spray arc transfer, for example. In welding, a spray arc transfer "sprays" a stream of tiny molten droplets across the arc, from the electrode 12 to the workpiece 30. In other words, the melting electrode 12 is sprayed into the weld pool. When combined with a shielding gas 20, the flow of the shielding gas 20 concentrates the deposit of the welding material and, thus, reduces the amount of spatter normally associated with self-shielded electrodes 12. The ability of the shielding gas 20 to reduce spatter contributes to the ability to weld with the electrode 12 in "all-position" welding. Further, the use of a shielding gas 20 in combination with the composition of the electrode 12 provides for higher deposition rates as compared to other forms of electrode. For instance, it has been observed that embodiments of the electrode combined with the shielding gas weld at higher deposition rates than AWS A5.20 E71T-8's and shielded metal arc welding covered electrodes 12.

Embodiments of the present technique may also include welding with a direct current electrode negative (DCEN) polarity. In the system 10 using a DCEN polarity, the electrode 12 is connected to a negative terminal and the workpiece 30 is connected to the positive terminal of a DC welding machine. In a DCEN setup, current flows from the workpiece 30 to the electrode 12 and may create an increased amount of heat buildup in the workpiece 30 as opposed to the electrode 12. This causes the workpiece 30 to melt more rapidly and enables the weld pool to more readily accept the molten droplets from the electrode 12, reducing spatter. The electrode 12 including compositions listed in FIG. 2 may be welded with a DCEN polarity to further increase their weldability and potential for "all-position" welding.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A flux-cored welding wire, comprising:
a sheath disposed around a core, wherein the core comprises between approximately 18% and approximately 22% of the flux-cored welding wire by weight, and wherein the core comprises between approximately 2% and approximately 11% aluminum by weight, and wherein the core comprises barium fluoride and is substantially free of both lithium and calcium fluoride, and wherein the flux-cored welding wire has a basicity index greater than 85, and wherein the flux-cored welding wire is configured to produce a weld deposit comprising between 0.15% and 1.1% aluminum by weight.

2. The flux-cored welding wire of claim 1, wherein the basicity index is greater than 99.

3. The flux-cored welding wire of claim 1, wherein the core is substantially free of silica ($SiO_2$), alumina ($Al_2O_3$), and zirconia ($ZnO_2$).

4. The flux-cored welding wire of claim 1, wherein the flux-cored welding wire is configured to be used in a gas-shielded arc welding process with a direct current electrode negative (DCEN) polarity.

5. A welding method, comprising:
joining two metal parts via an arc welding process, the arc welding process including:
advancing an electrode to a weld location of the two metal parts, wherein the electrode comprises between 0.4% and 2.5% aluminum by weight and has a basicity index greater than 51; and
creating a weld at the weld location to join the two metal parts, wherein creating the weld includes applying power to the electrode to create a welding arc and to produce a bead of weld deposit at the weld location and a basic slag over the bead, wherein the weld deposit comprises between 0.15% and 1.1% aluminum by weight and less than 0.0129% oxygen by weight.

6. The welding method of claim 5, wherein the electrode is substantially free of lithium.

7. The welding method of claim 5, wherein the weld deposit comprises nitrogen content that is less than 8.0056% by weight.

8. The welding method of claim 5, comprising providing a gas shield to the weld location, wherein the gas shield comprises argon, helium, or carbon dioxide, or any combination thereof.

9. The welding method of claim 5, wherein the weld deposit has a Charpy V-Notch (CVN) impact toughness value of at least 49 ft-lbs at −40° F.

10. The flux-cored welding wire of claim 1, wherein the weld deposit comprises between 0.3% and 0.8% aluminum by weight.

11. The flux-cored welding wire of claim 1, wherein the weld deposit comprises between 0.35% and 0.99% aluminum by weight.

12. The flux-cored welding wire of claim 1, wherein the flux-cored welding wire comprises between 0.4% and 2.5% aluminum by weight.

13. The flux-cored welding wire of claim 1, wherein the weld deposit comprises an oxygen content that is less than 0.0129% by weight.

14. The flux-cored welding wire of claim 1, wherein the weld deposit comprises less than 0.0056% nitrogen by weight.

15. A welding method, comprising:
  joining two metal parts via an arc welding process, the arc welding process including:
    advancing an electrode to a weld location of the two metal parts, wherein the electrode comprises between 0.4% and 2.5% aluminum by weight and has a basicity index greater than 51; and
    creating a weld at the weld location to join the two metal parts, wherein creating the weld includes applying power to the electrode to create a welding arc and to produce a bead of weld deposit at the weld location and a basic slag over the bead, wherein the weld deposit comprises between 0.15% and 1.1% aluminum by weight and less than 0.0056% nitrogen by weight.

16. The welding method of claim 15, wherein applying power comprises applying power of direct current electronegative (DCEN) polarity.

17. The welding method of claim 15, comprising providing a gas shield to the weld location, wherein the gas shield comprises argon, helium, or carbon dioxide, or any combination thereof.

18. The welding method of claim 15, wherein the weld deposit comprises between 0.35% and 0.99% aluminum by weight.

19. The welding method of claim 15, wherein the weld deposit comprises an oxygen content that is less than 0.0129% by weight.

* * * * *